Patented May 16, 1950

2,508,341

UNITED STATES PATENT OFFICE 2,508,341

VINYL RESIN EMULSION

Wilfred K. Wilson, Springfield, Mass., assignor to Shawinigan Resins Corporation, Springfield, Mass., a corporation of Massachusetts No Drawing. Application June 19, 1946,
Serial No. 677,902

20 Claims. (Cl. 260—17)

This invention relates to the emulsion polymerization of normally liquid polymerizable materials containing a terminal ethylene group ($CH_2=C<$).

Various methods have been proposed for polymerizing aqueous emulsions of compounds containing terminal ethylene groups. Usually the object of such processes has been the production of stable emulsions. However, such prior processes have tended to be deficient in certain respects. For example, difficulty has been encountered in producing emulsions with a high concentration of polymer particles of small and uniform particle size. Other difficulties encountered include lack of stability of the emulsion, poor filming properties, etc.

It is an object of this invention to provide aqueous emulsions of polymerized normally liquid polymerizable materials containing terminal ethylene groups. A particular object is to provide stable aqueous emulsions of polymerized normally liquid polymerizable materials containing terminal ethylene groups, which are characterized by small and uniform particle size, good filming properties and a polymer:water ratio greater than 25:100. A further object is to provide a new process for polymerizing normally liquid polymerizable materials containing terminal ethylene groups in aqueous emulsion.

These and other objects are attained according to this invention by polymerizing normally liquid polymerizable materials containing terminal ethylene groups as the dispersed phase of an aqueous emulsion protected by a combination of a non-polymerizable surface tension depressant and a hydrophilic colloid, the initial amount of monomer that is introduced not exceeding about 25 parts by weight for every 100 parts of water present and the remainder being added at such a rate that this ratio of monomer to water is not exceeded throughout substantially the entire polymerization period. By operating in this manner, emulsions of unexpectedly fine and uniform particle size may be prepared. For example, polyvinyl acetate emulsions having particles with an average diameter of not over about $2\mu$ are obtained.

The following examples are illustrative of the present invention, but are not to be considered as limitative of the scope thereof. Where parts are given, they are parts by weight. In the tables below, the numerals refer to parts by weight.

In Table A are set forth the variations in type and amount of wetting agent and hydrophilic colloid used in Examples I-XI.

The remaining ingredients of the examples and the procedure employed in each case are set forth below.

| | Parts |
|---|---|
| Vinyl acetate | 53 |
| Water | 44 |
| $FeCl_3.6H_2O$ | 0.002 |
| Hydrogen peroxide | 0.02 |

About 10% of the vinyl acetate, 25% of the hydrogen peroxide and all of the remaining ingredients listed above are charged into a reaction vessel equipped with an agitator and a water-cooled return condenser. The mixture is then heated to about 75–80° C. with moderate agitation and while continuing the agitation and the same temperature, 75% of the remaining hydrogen peroxide (in a 0.3% aqueous solution) and all of the remaining vinyl acetate are slowly added. The rate of addition of these ingredients is such that maintenance of the 75–80° C. temperature is possible with little or no refluxing. About 2–3 hours are usually required.

After all of the vinyl acetate is added, the remainder of the hydrogen peroxide (in a 0.3% aqueous solution) is introduced and the temperature of the mixture is raised to 85–90° C. After 15–30 minutes at this temperature, the mixture is cooled to room temperature.

TABLE A

| Example | I | II | III | IV | V | VI | VII | VIII | IX | X | XI |
|---|---|---|---|---|---|---|---|---|---|---|---|
| Gum Arabic | 2.5 | 2.0 | 2.5 | 2.5 | 2.5 | 2.5 | 2.5 | 2.5 | | | |
| Sodium Salt of dioctyl sulfo-succinate | 0.15 | | | | | | | | 0.15 | 0.15 | 0.15 |
| Santomerse #3 | | 0.20 | | | | | | | | | |
| Aresklene #400 | | | 0.1 | | | | | | | | |
| Nekal BX high concentration | | | | 0.1 | | | | | | | |
| Invadine N | | | | | 0.1 | | | | | | |
| Anhydrous Wettal | | | | | | 0.3 | | | | | |
| Emulsol 607 | | | | | | | 0.2 | | | | |
| Triton NE | | | | | | | | 0.3 | | | |
| Gum Tragacanth | | | | | | | | | 1.0 | | |
| Cellosize WS 100 | | | | | | | | | | 2.5 | |
| Sodium carboxy methyl cellulose | | | | | | | | | | | 2.0 |

The following examples in Table B illustrate the preparation of emulsions using a different type of polymerization catalyst, namely potassium persulfate. In each of the examples 53 parts of vinyl acetate and 42 parts of water are used in the charge in addition to the ingredients set forth in Table B. The procedure employed for carrying out the polymerization is the same in each example. About 5% of the vinyl acetate and all of the remaining ingredients are charged into the reaction vessel equipped with an agitator and water-cooled condenser. The mixture is then heated to about 75–80° C. with moderate agitation and while continuing the agitation and maintaining the same temperature, the remaining vinyl acetate is slowly added. The rate of addition of the vinyl acetate is such as to permit the maintenance of the 75–80° C. temperature with little or no refluxing. About 3 hours is required for the addition of the vinyl acetate. Thereafter, the temperature of the reaction mixture is raised to 85–90° C. After 15–30 minutes at this temperature, the emulsion is cooled to room temperature.

TABLE B

| Example | XII | XIII | XIV |
|---|---|---|---|
| Gum Arabic | 3.5 | | |
| Sodium cellulose glycollate | | 2.5 | |
| Cellosize WS 100 | | | 2.5 |
| Santomerse #3 | 0.15 | | |
| Sodium sulfonate of dioctyl succinate | | 0.15 | 0.15 |
| Potassium persulfate | 0.2 | 0.4 | 0.2 |

The emulsions of the present invention as illustrated by the foregoing examples in Tables A and B are characterized by unexpected and valuable properties as a result of the particular combination of dispersing means and polymerization conditions employed. Thus, these emulsions are characterized by containing polymer particles of a very small and substantially uniform size. For example, most of the particles in the emulsions of Examples I–XIV vary in diameter from about 0.2 $\mu$ to not over 2.0 $\mu$. Obviously, such a small and uniform particle size renders the emulsions of particular value for many applications. In addition, the emulsions generally are stable over long periods of time in that no "sludging" occurs. The emulsions are particularly adapted for casting films on various surfaces which, after drying, are characterized by clarity and high water resistance, particularly as evidenced by resistance to emulsification upon contact with water. Further advantages of these emulsions include good mechanical stability, i. e. freedom from de-emulsification or agglomeration on "rubbing" the emulsion between two surfaces.

Certain differences are to be noted between the several emulsions of Examples I–XIV which render some of the products particularly valuable for certain purposes and others for other purposes. However, from the standpoint of stability and particle size characteristics, these emulsions are generally unexpectedly superior to emulsions prepared by other methods.

As examples of certain differences which result from variations in the nature and amounts of the various ingredients set forth in the examples, it is noted that a substantial proportion of the polyvinyl acetate in the product of Example I is insoluble in the usual solvents for polyvinyl acetate. On the other hand, the polymer contained in the product of example II is soluble in the usual solvents for polyvinyl acetate and solutions of the polymer can be prepared which are within a readily measurable range of viscosities. The product in Example IV is especially characterized by freedom from clustering of the particles, i. e., the particles do not tend to cluster so as to produce an emulsion having a high apparent viscosity which is greatly decreased by rapid and vigorous agitation.

Other outstanding characteristics of the examples given in Tables A and B include the usually fine average diameter of the particles in the product of Example II (less than 1$\mu$) and the exceptional clarity and other valuable properties of films made therefrom. The polymer particles in the product in Example X have a similar degree of fineness and such emulsions have stood for for than 6 months without sludging. The product in Example XIV is exceptionally resistant to creaming, i. e., separation of supernatant liquid.

The following examples in Table C further illustrate the preparation of emulsions using potassium persulfate as the catalyst. The pocedure employed for the polymerization is the same as that used in the examples in Table B except that a solution of the sodium bicarbonate in about 10% of the water used, is added during the polymerization at such a rate that a substantially constant addition of the solution takes place throughout the heating period.

TABLE C

| Example | XV | XVI |
|---|---|---|
| Vinyl acetate | 56 | 56 |
| Water | 42 | 42 |
| Cellosize WS 100 | 1.0 | 1.3 |
| Santomerse #3 | 0.15 | 0.1 |
| Potassium persulfate | 0.05 | 0.2 |
| Sodium bicarbonate | 0.11 | 0.15 |
| Sapamine MS Conc. | 0.10 | |
| Properties of the Product: | | |
| Emulsion viscosity (Modified Scott cup units at 20° C) | 1,400 | 940 |
| Polymer viscosity at 20° C centipoises | 68.3 | |
| Average particle size ($\mu$) | 0.5–1.0 | 0.5–1.0 |
| pH | 4.8–5.0 | 4.8–5.0 |
| Acidity calculated as acetic acid per cent | <0.1 | <0.1 |
| Residual monomeric vinyl acetate do | <0.5 | <0.5 |
| Solids content do | 56.5 | 56.5 |

As can be seen from the results set forth above, the products in Examples XV and XVI are characteristic of the products of the invention in that a very small average particle size is obtained. In addition, it is noted that substantially all of the particles fall within the range set forth.

The product in Example XV is especially characterized by freedom from foaming on vigorous agitation during polymerization due to the inclusion of Sapamine MS Concentrated, (diethyl amino ethyl oleylamide acetate).

The products are also characterized by freedom from "sludging" and "creaming" (separation of supernatent liquid) on standing for long periods of time.

As pointed out above, not over about 25 parts by weight of the polymerizable material for every 100 parts of water are initially introduced into the dispersing medium. Thereafter, the remainder of the monomer is preferably introduced at such a rate that this ratio of monomer to water is not exceeded. In contrast to such a process, if more than 25 parts of monomer is added initially, the average particle size of the polymer particles is greatly increased. However, within this range emulsions having an average particle size of less than 2$\mu$ are readily obtained as is shown by the results in Table D, wherein the results of initially introducing 5, 10, 15 and 20% of the monomer are shown.

The charge in each of the examples in Table D is the following:

| | Parts |
|---|---|
| Vinyl acetate | 53 |
| Water | 44 |
| Gum arabic | 2.5 |
| Acetic acid | 0.5 |
| Hydrogen peroxide | 0.04 |
| FeCl$_3$.6H$_2$O | 0.002 |

In carrying out the polymerization, the specified amount of vinyl acetate, 25% of the hydrogen peroxide and all of the remaining ingredients are charged into a reaction vessel equipped with an agitator and a water-cooled return condenser. The mixture is then heated to about 75–80° C. with moderate agitation, and while continuing the agitation and the same temperature, 75% of the remaining hydrogen peroxide in a 0.3% aqueous solution and all of the remaining vinyl acetate are slowly added. After all of the vinyl acetate is added, the remainder of the hydrogen peroxide in a 0.3% aqueous solution is introduced and the temperature of the mixture is raised to 85–90° C. After about 15 minutes at this temperature, the mixture is cooled to room temperature.

TABLE D
VARIATION IN INITIAL VINYL ACETATE

| Example | Proportion of total vinyl acetate added initially | Time for remaining monomer addition | Average particle size ($\mu$) |
|---|---|---|---|
| | Per cent | Hours | |
| XVII | 5 | 5 | <0.5 |
| XVIII | 10 | 4¾ | <0.5 |
| XIX | 15 | 4¼ | <1.0 |
| XX | 20 | 3¾ | 1.0–1.5 |

While it is essential that the initial amount of monomer does not exceed the limit set forth above, rates of addition of the remaining monomeric material somewhat faster than those set forth above in Table D may be used when desired without adverse effect on the size of the polymer particles or of the clarity of films made from the emulsions. This is evident from consideration of the results set forth in Examples XXI and XXII in Table E in comparison with Example XVII. The ingredients of the charges and the polymerization method in each case is the same as that used in examples in Table D except that the amount of monomeric vinyl acetate introduced initially is the same in each example and the period during which the remaining vinyl acetate is added is varied from 2 hours in Example XXI to 5 hours in Example XVII. However, in each case there is no excessive accumulation of monomer since the temperature of the mix is readily kept above the boiling point of the monomer.

TABLE E
VARIATION IN RATE OF ADDITION OF REMAINING VINYL ACETATE
(5% of total added initially)

| Example | Time | Average Particle Size ($\mu$) | Acidity | Viscosity (20° C.) | Film Clarity |
|---|---|---|---|---|---|
| | Hours | | Percent | Cp. | |
| XXI | 2 | <0.5 | 0.82 | 3240 | Very good. |
| XXII | 3 | <0.5 | 0.96 | 1420 | Do. |
| XVII | 5 | <0.5 | 1.15 | 1364 | Do. |

As pointed out above and as illustrated in the examples, the process of the invention comprises initially introducing not over about 25 parts of the monomeric material to be polymerized for each 100 parts of water and after polymerization has been initiated, introducing the remainder of the polymerizable material, either continuously or by stepwise addition. Preferably, the remainder of the monomeric material is introduced at such a rate that substantially throughout the polymerization the amount of unpolymerized material does not exceed about 25 parts for every 100 parts of water present. An alternative method of carrying out the polymerization comprises introducing the monomeric material substantially at the rate of polymerization throughout the reaction. For example, the mixture of water, wetting agent and colloid may be heated to the selected reaction temperature and thereafter the monomer introduced at substantially its rate of polymerization.

The polymerization method of the invention is surprisingly found to be readily adapted to polymerization of monomers boiling below 100° C. e. g., vinyl acetate under atmospheric reflux conditions at temperatures below 100° C., but above the boiling point of such monomeric materials. Thus, following the initial addition of the vinyl acetate, the reaction mixture may be heated to a polymerization temperature in excess of the boiling point of the vinyl acetate, i. e., 75–80° C. During the course of this heating period, sufficient vinyl acetate polymerizes so that the boiling point of the mixture increases to a temperature at least equal to the temperature selected for polymerization. Thereafter, the vinyl acetate may be added at such a rate that the boiling point of the reaction mixture continues to be at least equal to the selected polymerization temperature. The maximum rate at which the vinyl acetate may be added without causing the boiling point of the mixture to fall below the polymerization temperature is substantially the rate of polymerization of the monomer, although it may be that an increasing accumulation of monomer is possible as the polymerization continues due to greater absorptive capacity of the mixture by virtue of increased quantity of polymer.

The process of the present invention is applicable to normally liquid polymerizable compounds generally which contain a terminal ethylene group (CH$_2$=C<). Thus, various vinyl or vinylidene compounds and mixtures thereof may be used, as for example, vinyl esters of organic acids, such as vinyl acetate, vinyl propionate, vinyl butyrate; vinylidene halides, such as vinylidene chloride, vinylidene bromide; olefine benzenes, such as styrene, alpha methyl styrene, ortho chlorostyrene, para chlorostyrene and various polymerizable polychlorostyrenes; vinyl ketones, such as methyl vinyl ketone and ethyl vinyl ketone; vinyl or substituted vinyl group-containing acids and esters thereof such as acrylic acid, methacrylic acid, methyl acrylate, ethyl acrylate, methyl methacrylate and ethylene glycol di-methacrylate.

Particularly valuable and unexpected results are obtained on polymerizing vinyl esters of lower aliphatic acids containing 2–6 carbon atoms such as vinyl acetate, vinyl propionate, vinyl butyrate, vinyl valerate and vinyl hexoate and mixtures thereof.

Usually the polymerization in aqueous emulsion is carried out at a pH of 2–7, and preferably within the range 4–6, particularly in the case of vinyl esters or other esters which tend to hydrolyze excessively at higher acidities. When it is desired to lower the initial pH of the polymerizing mixture, various acids may be used for this purpose, such as formic acid, acetic acid, chloracetic acid, benzene sulfonic acid, toluene sulfonic acid, nitric acid, hydrochloric acid, sulfuric acid and the like.

The non-polymerizable surface tension depressants or wetting agents may be one or more of the well-known wetting agents, as for example, anionic, cationic, or non-ionic wetting agents, such as the alkali metal, ammonium and amine salts of long chain fatty acids, for example, sodium oleate, sodium palmitate, potassium stearate, Marseilles soap, diethanol amine laurate; alkali metal sulfonates of aliphatic or alkyl-aromatic hydrocarbons of high molecular weight, such as the alkyl naphthalene sulfonic acids, for example, isobutyl naphthalene sulfonic acid; sodium lauryl sulfate; salts of sulfonates of alkyl esters of dicarboxylic acids, for example, the sodium salt of dioctyl sulfo-succinate (Aerosol O. T.); wetting agents marketed under the following trade names, Nekals, particularly Nekal BX high concentration (sodium diisobutyl naphthalene sulfonate); Santomerse, e. g. Santomerse #3 (dodecyl benzene sodium sulfonate) and Santomerse D, (decyl benzene sodium sulfonate), Aresklene (sodium disulfonate of dibutyl phenyl phenol), Tergitols (sodium sulfonate of higher synthetic secondary alcohols), Invadine N (sodium alkyl naphthalene sulfonate), Anhydrous Wettal, Triton NE (aryl alkyl polyether alcohols), Emulsol 607 (quaternary ammonium derivative of the pyridine betaine type made from a blend of fatty acids).

Generally, it is to be preferred that the surface tension depressants used be resistant to hydrolysis under the conditions of polymerization. Thus, particularly preferred for polymerizing under acid conditions is the class of wetting agents characterized by containing a sulfonate group and one or more long chain alkyl groups, i. e., alkyl chains having 6–18 carbon atoms as exemplified by Santomerse #3 and the sodium sulfonate of dioctyl succinate, etc.

Numerous other variations may be introduced into the process of the invention as illustrated by the specific examples. For example, other polymerizing temperatures may be used, the exact temperature depending in part on the nature of the polymerizable material and on the nature of the polymer desired. However temperatures between 60° C. and 100° C. are usually employed in the case of esters, and furthermore, it has been noted that the activity of a complex catalyst comprising an iron compound and hydrogen peroxide or a material generating hydrogen peroxide shows a sharp increase when the temperature is raised above about 70° C. When necessary, for example, to avoid escape of volatile materials, the polymerization may be carried out under pressure in a closed system.

Various water-soluble per compounds may be used in place of the peroxides employed in the examples, such as per-acetic acid, sodium perborate, potassium perborate, sodium persulfate, potassium persulfate, sodium peroxide, potassium peroxide, urea peroxide and the like. The amount employed is usually such as to contain 0.001–0.1 part of available oxygen for every 100 parts of water.

When the catalyst employed comprises a complex catalyst made with an iron compound and hydrogen peroxide, or a substance generating hydrogen peroxide during the polymerization, the iron compound initially may be either in the form of a ferrous or a ferric compound. Examples include the nitrates, chlorides, sulfates, acetates, sulfonic acid salts, e. g. the iron salts of benzene sulfonic acid, toluene sulfonic acid, and the like.

Examples of suitable hydrophilic colloids which may be used in the process of the invention include polyvinyl alcohol, partially hydrolyzed polyvinyl acetate, for example, polyvinyl alcohol containing up to 10% acetate groups. These colloids are especially suitable when they are made from polyvinyl acetate having a viscosity of over 7 centipoises as determined in a 1-molar benzene solution at 20° C. Other suitable colloids are soluble starch, soluble starch degradation products, e. g., Stayco M, the methyl ether of cellulose, water-soluble glycol cellulose, gum tragacanth, gum acacia, sodium alginate, agar-agar, gum tragon, gum arabic, glue, gelatine, Gomagel, Cellosize WS (hydroxy ethyl cellulose), sodium carboxy methyl cellulose and the like.

The amounts of hydrogen peroxide or hydrogen peroxide generating substances and the iron compounds used in complex catalysts may be substantially varied—the amounts employed in any particular charge depending upon such factors as the nature of the material being polymerized, the viscosity desired in the polymer, etc. In general, small amounts are sufficient and usually from 0.0002–0.004 part of combined iron and 0.01–0.20 part of hydrogen peroxide or an amount of an hydrogen peroxide generating substance equivalent thereto in available oxygen, i. e. 0.001–0.1 part of available oxygen are used for every 100 parts of water.

The amounts of wetting agent and hydrophilic colloid may be substantially varied. Large amounts of such materials are usually undesirable since they may adversely affect the characteristics of the product. On the other hand, a certain minimum is necessary for proper stability of the emulsion both during and after polymerization. Usually 0.01 part to 2.0 parts and preferably 0.1–1 part of a wetting agent and 1 to 10 parts of protective colloid per 100 parts of water are found to produce exceptionally valuable products.

In making aqueous emulsions of polymerized vinyl compounds according to the process of the invention, the ratio of water to polymerizable compound may be varied substantially. As pointed out above, a valuable feature of the invention resides in the fact that valuable emulsions are readily prepared which have a polymer: water ratio of over 25:100. Generally, much lower amounts of water are used, e. g., weight ratios of water to polymerizable compound of between 60:40 and 40:60. Usually the weight ratio of water to polymerizable compounds is not lower that 30:70 since the viscosity of the polymerizing mixture becomes too high to permit adequate agitation. A particularly valuable characteristic of the process of the invention resides in the fact that emulsions may be produced having an exceptionally high solids contents, e. g., 40 to 60%, and in which the polymer is made up of particles of small and uniform particle size.

When a complex catalyst of the type used in Examples I–XI is employed, it is most advantageous as pointed out above to add only a minor proportion of the hydrogen peroxide or hydrogen peroxide generating material to the initial charge. The proportion of the hydrogen peroxide that is added after the polymerization has been initiated may be varied substantially, e. g., 10-90%. However, it is preferred that the addition of a major proportion of the hydrogen peroxide be delayed, e. g., more than 50% and preferably at least 70%. If desired, the addition of all of the hydrogen peroxide may be delayed until the mixture has reached the desired reaction temperature, provided such temperature does not exceed the boiling point of the mixture. However, a somewhat smoother reaction generally results if 10-30% of the hydrogen peroxide is added initially. Also, according to a preferred procedure when the polymerizable compound is slowly added, the addition of from 5-15% of the hydrogen peroxide is delayed until all of the polymerizable compound has been added.

When the vinyl compound and the hydrogen peroxide are added together, either continuously or by successive additions as the polymerization continues, the ratio of the two ingredients in each addition to the charge is preferably kept constant, e. g., by premixing the hydrogen peroxide and the vinyl compound and adding portions of the mixture.

The emulsions of the invention are especially valuable for forming films on various types of materials such as cloth, paper, wood, metals, glass and the like. The particularly valuable properties of films formed from these emulsions include resistance to water. Thus, prior emulsions of such materials as polyvinyl acetate tended to re-emulsify when immersed in water. Usually, when it is desired to form films from the emulsions, it is advantageous to add to the emulsions a small amount, e. g., 2 to 10%, of a plasticizer for the particular film-forming phase of the emulsion. In the case of polyvinyl acetate emulsions, for example, such plasticizers as dibutyl phthalate, triethylene glycol dihexoate, are used. Films resulting from such products are characterized not only by resistance to water, but are uniform, clear and possess high wet strength after immersion in water.

This application is a continuation in part of my copending application, Serial Number 648,574, filed February 18, 1946, now U. S. Patent No. 2,473,929.

The foregoing description is given in illustration and not in limitation of the invention as set forth in the appended claims.

What is claimed is:

1. A process for preparing a stable aqueous emulsion containing more than 25 parts for each 100 parts of water of a polymerized normally liquid, water-insoluble polymerizable compound containing a terminal ethylene group, which comprises carrying out the polymerization of said polymerizable compound while dispersed in an aqueous medium containing for every 100 parts of water, 0.01-2.0 parts of a non-polymerizable surface tension depressant, 1-10 parts of a hydrophilic colloid and a sufficient amount of a water-soluble per compound to supply 0.001-0.1 part of available oxygen, the polymerizable material being introduced into said aqueous medium at such a rate that not over about 25 parts of monomer for every 100 parts of water are present substantially throughout the polymerization.

2. A process for preparing a stable aqueous emulsion containing more than 25 parts for each 100 parts of water of a polymerized vinyl ester of acids containing 2-6 carbon atoms which comprises carrying out polymerization of said polymerizable compound while dispersed in an aqueous medium containing for every 100 parts of water, 0.01-2.0 parts of a non-polymerizable surface tension depressant, 1-10 parts of a hydrophilic colloid and a sufficient amount of a water-soluble per compound to supply 0.001-0.1 part of available oxygen, the polymerizable material being introduced into said aqueous medium at such a rate that not more than about 25 parts of monomer for every 100 parts of water are present substantially throughout the polymerization.

3. A process for preparing a stable aqueous emulsion containing more than 25 parts of a polymerized vinyl acetate for each 100 parts of water which comprises carrying out polymerization of said polymerizable compound while dispersed in an aqueous medium containing for every 100 parts of water, 0.01-2.0 parts of a non-polymerizable surface tension depressant, 1-10 parts of a hydrophilic colloid and a sufficient amount of a water-soluble per compound to supply 0.001-0.1 part of available oxygen, the polymerizable material being introduced into said aqueous medium at such a rate that not more than about 25 parts of monomer for every 100 parts of water are present substantially throughout the polymerization.

4. A process as defined in claim 1 in which not over about 25 parts of monomer are initially introduced for every 100 parts of water and the balance is introduced at substantially the rate of polymerization.

5. A process as defined in claim 1 in which the surface tension depressant is characterized by containing a sulfonate group and a long chain alkyl group having 6-18 carbon atoms.

6. A process as defined in claim 1 in which the polymerizable compound is a vinyl ester of acids containing 2-6 carbon atoms and a surface tension depressant is characterized by having a sulfonate group and an alkyl chain containing 6-18 carbon atoms.

7. A process as defined in claim 3 in which the surface tension depressant is characterized by containing a sulfonate group and an alkyl chain having 6-18 carbon atoms.

8. A process for preparing a stable aqueous emulsion containing a weight ratio of polyvinyl acetate to water between 40:60 and 60:40 which comprises polymerizing the vinyl acetate in the presence of a water-soluble per compound while dispersed in an aqueous medium containing a non-polymerizable surface tension depressant characterized by containing a sulfonate group and an alkyl chain having 6-18 carbon atoms and a hydrophilic colloid characterized by containing hydroxyl groups, not over 25 parts of the polymerizable material for every 100 parts of water being added initially and thereafter the remainder of the vinyl acetate being introduced at such a rate that not over about 25 parts of monomer for every 100 parts of water are present substantially throughout the polymerization, the amount of available oxygen in the per compound being in the range 0.001-0.1 part, the amount of surface tension depressant being in the range 0.01-2.0 parts and the amount of hydrophilic colloid being in the range 1-10 parts for each 100 parts of water.

9. A process as defined in claim 8 in which the surface tension depressant is dodecyl benzene sodium sulfonate.

10. A process as defined in claim 8 in which the surface tension depressant is the sodium salt of dioctyl sulfo-succinate.

11. A process for preparing a stable aqueous emulsion of a polyvinyl acetate containing more than 25 parts of polymer for every 100 parts of water which comprises polymerizing vinyl acetate in the presence of a sufficient amount of a water-soluble persulfate to supply 0.001–0.1 part of available oxygen for every 100 parts of water while dispersed in an aqueous medium containing for every 100 parts of water, 1–10 parts of a hydroxy ethyl cellulose and 0.01–2.0 parts of an alkali metal sulfonate of an alkyl-aryl hydrocarbon, said hydrocarbon containing 10–20 carbon atoms, the vinyl acetate being introduced into the aqueous medium at such a rate that not over about 25 parts of monomer for every 100 parts of water are present substantially throughout the polymerization.

12. A process as defined in claim 11 in which not over 25 parts of monomer are initially introduced for every 100 parts of water and the balance is introduced at substantially the rate of polymerization.

13. A process as defined in claim 11 in which the alkyl group in the alkali metal sulfonate contains 10–12 carbon atoms and the aryl group is a benzene group.

14. A process for preparing a stable aqueous emulsion containing a weight ratio of polyvinyl acetate to water between 40:60 and 60:40 which comprises polymerizing the vinyl acetate in the presence of potassium persulfate while dispersed in an aqueous medium containing a hydroxy ethyl cellulose and an alkali metal sulfonate of an alkyl benzene, said alkyl benzene containing 16–18 carbon atoms, not over 25 parts of the vinyl acetate for every 100 parts of water being added initially and thereafter the remainder of the vinyl acetate being introduced at such a rate that not over 25 parts of monomer for every 100 parts of water are present substantially throughout the polymerization, the amount of available oxygen supplied by the potassium persulfate being in the range of 0.001–0.1 part, the amount of the alkali metal sulfonate being in the range of 0.01–2.0 parts and the amount of hydroxy ethyl cellulose being in the range of 1–10 parts for every 100 parts of water.

15. A process for preparing a stable aqueous emulsion of polyvinyl acetate containing more than 25 parts of polymer for every 100 parts of water which comprises polymerizing vinyl acetate while dispersed in an aqueous medium containing for every 100 parts of water, 1–10 parts of gum arabic, 0.01–2.0 parts of a non-polymerizable surface tension depressant characterized by containing an alkali metal sulfonate group and 10–20 carbon atoms, and a sufficient amount of a water-soluble per compound to supply 0.001–0.1 part of available oxygen, the vinyl acetate being introduced into the aqueous medium at such a rate that not over about 25 parts of monomer for every 100 parts of water are present substantially throughout the polymerization.

16. A process as defined in claim 15 in which not over about 25 parts of monomer are initially introduced for every 100 parts of water and the balance is introduced at substantially the rate of polymerization.

17. A process as defined in claim 15 in which the surface tension depressant is dodecyl benzene sodium sulfonate.

18. A process as defined in claim 15 in which the surface tension depressant is the sodium salt of dioctyl sulfosuccinate.

19. A process for preparing a stable aqueous emulsion containing a weight ratio of polyvinyl acetate to water between 40:60 and 60:40 which comprises polymerizing the vinyl acetate in the presence of a water-soluble per compound while dispersed in an aqueous medium containing gum arabic and a non-polymerizable surface tension depressant characterized by containing an alkali metal sulfonate group and 10–20 carbon atoms, 6–18 carbon atoms thereof being in the form of an alkyl chain, not over 25 parts of the vinyl acetate for every 100 parts of water being added initially and thereafter the remainder of the vinyl acetate being introduced at such a rate that not over 25 parts of monomer for every 100 parts of water are present substantially throughout the polymerization, the amount of available oxygen supplied by the per compound being in the range of 0.001–0.1 part, the amount of surface tension depressant being in the range of 0.01–2.0 parts and the amount of gum arabic being in the range of 1–10 parts for every 100 parts of water.

20. A stable aqueous emulsion containing for every 100 parts of water more than 25 parts of a polymerized normally liquid water-insoluble polymerizable compound containing a terminal ethylene group, the internal phase of the emulsion having an average particle diameter of less than 2 microns and having substantially no particles above 2 microns in diameter, said emulsion having been prepared by the process as described in claim 1.

WILFRED K. WILSON.

REFERENCES CITED

The following references are of record in the file of this patent:

UNITED STATES PATENTS

| Number | Name | Date |
|---|---|---|
| 2,068,424 | Mark et al. | Jan. 19, 1937 |
| 2,109,981 | Voss et al. | Mar. 1, 1938 |
| 2,339,184 | Neher et al. | Jan. 11, 1944 |
| 2,363,951 | Fikentscher | Nov. 28, 1944 |
| 2,398,344 | Collins et al. | Apr. 16, 1946 |
| 2,444,396 | Collins et al. | June 29, 1948 |